United States Patent
Wurtenberger et al.

(10) Patent No.: US 7,050,804 B1
(45) Date of Patent: May 23, 2006

(54) METHOD AND SYSTEM FOR IMPROVING MOBILE COMMUNICATION HANDOFFS USING PILOT BEACONS

(75) Inventors: Andy Wurtenberger, Olathe, KS (US); Eric Thompson, Platte City, MO (US); Jason Sigg, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 295 days.

(21) Appl. No.: 10/756,959

(22) Filed: Jan. 13, 2004

(51) Int. Cl.
*H04Q 7/20* (2006.01)

(52) U.S. Cl. .................. 455/436; 455/67.11; 455/439; 455/456.1; 370/331; 370/332

(58) Field of Classification Search ................ 455/436, 455/440, 439, 456.1, 446, 424, 425, 67.11, 455/67.13; 370/331, 332
See application file for complete search history.

(56) References Cited

U.S. PATENT DOCUMENTS

| | | | |
|---|---|---|---|
| 5,828,661 A | 10/1998 | Weaver, Jr. et al. | 370/331 |
| 5,848,063 A | 12/1998 | Weaver, Jr. et al. | 370/331 |
| 5,917,811 A | 6/1999 | Weaver, Jr. et al. | 370/332 |
| 6,321,090 B1 * | 11/2001 | Soliman | 455/440 |
| 6,430,168 B1 | 8/2002 | Djurkovic et al. | 370/331 |
| 6,549,524 B1 | 4/2003 | Shin | 370/331 |
| 6,565,610 B1 | 5/2003 | Wang et al. | 715/517 |
| 6,631,267 B1 | 10/2003 | Clarkson et al. | 455/446 |
| 2002/0012385 A1 | 1/2002 | Yun et al. | 375/146 |
| 2002/0034947 A1 | 3/2002 | Soliman | 455/436 |
| 2003/0003918 A1 | 1/2003 | Proctor et al. | 455/446 |

OTHER PUBLICATIONS

Group 3(b), "PROJECT 3—Load Sharing in DS-CDMA Systems for Hot Spot Traffic Case", Final Version, Jun. 11, 1999.

* cited by examiner

*Primary Examiner*—Melur Ramakrishnaiah

(57) ABSTRACT

A method of improving mobile communication hard handoffs comprises receiving signal quality information for a first pilot signal of a first frequency, the first pilot signal being from a first cellular site and receiving signal quality information for a second pilot signal of the first frequency, the second pilot signal being from a second cellular site. The method further includes generating an output display that includes first predicted locations for hard handoffs from the first cellular site to the second cellular site. The output display is generated based on a parameter of a first value that is representative of a ratio between the strength of the second pilot signal relative to the combined strength of, at least, the second pilot signal and the first pilot signal. The method still further comprises modifying the parameter from the first value to a second value and regenerating the output display to include second predicted hard handoff locations.

29 Claims, 6 Drawing Sheets

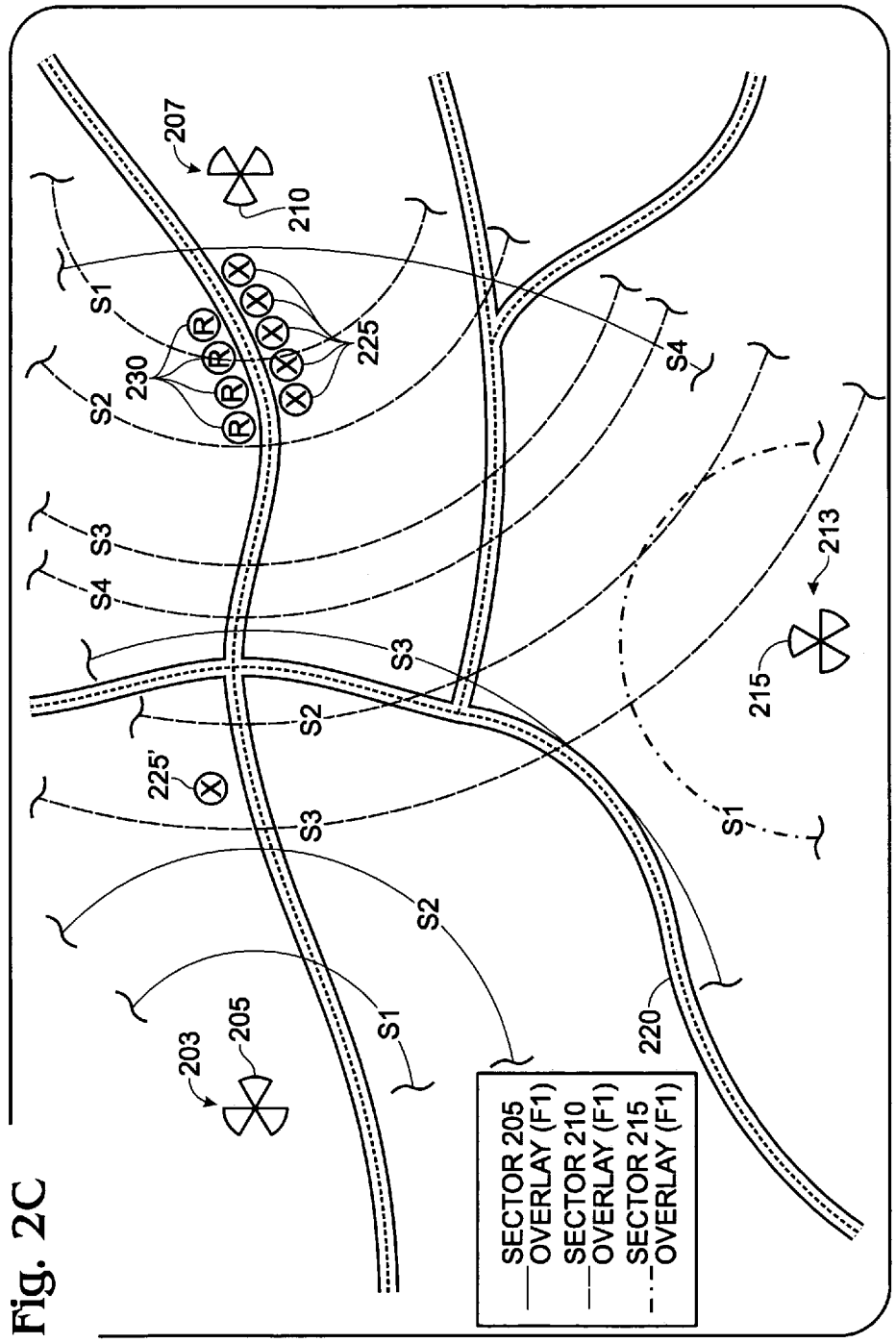

METHOD AND SYSTEM FOR IMPROVING MOBILE COMMUNICATION HANDOFFS USING PILOT BEACONS

BACKGROUND

I. Field of the Invention

This invention is directed to wireless communication systems. More specifically, this invention is directed to methods for analyzing and improving the locations for hard handoffs in wireless communication systems.

II. Description of Related Art

In a typical cellular radio communications system (wireless telecommunications network), an area is divided geographically into a number of transmission areas, or cell sites. Each cell site is defined by a radio frequency (RF) radiation pattern from a base transceiver station (BTS) antenna. The base station antennae in the cells are in turn coupled to a base station controller (BSC), which is then coupled to a telecommunications switch or gateway, such as a mobile switching center (MSC). The MSC may then be coupled to a telecommunications network such as the PSTN (Public Switched Telephone Network) or the Internet. Further, commonly owned BSCs for multiple base stations (such as those of a specific service provider) may be coupled to a base station manager (BSM) that handles communication between those BSCs for managing communication traffic in the wireless network.

When a mobile station (MS) such as a cellular telephone, pager, PDA, or appropriately equipped portable computer, is positioned in a cell, the MS communicates via an RF air interface with the BTS antenna of the cell. Thus, a communication path is established between the MS and the telecommunications network, via the RF interface, the BTS, the BSC and the MSC.

With the rapid growth in demand for wireless communications, the level of call traffic in most cell sites has increased dramatically in recent years. To help manage the call traffic, most cells in a wireless network are usually further divided geographically into a number of sectors, each defined by radiation patterns from directional antenna components of the BTS, or by BTS antennae. These sectors (which can be visualized ideally as pie pieces) can be referred to as "physical sectors," since they are physical transmission/reception areas (hereafter "transmission area(s)") of a cell site. Therefore, at any given time, an MS in a wireless network will typically be positioned in a given physical sector and will be able to communicate with the telecommunications network via the BTS serving that physical sector.

In CDMA (Code Division Multiple Access) systems, which are known, each physical sector is distinguished from geographically adjacent physical sectors by a PN offset number or key. PN offsets are pseudo-noise (e.g., deterministic "noise-like" information) that is inserted in the carrier signal for the corresponding sector. When a mobile station is in a particular physical sector, communication between the mobile station and the BTS of the cell site are encoded by the physical sector's PN offset key, regardless of the carrier frequency being used. This allows the same carrier frequency to be used by geographically adjacent sectors with minimal interference between the sectors occurring.

In areas where wireless communication traffic is particularly high, cell sites in those areas may employ more than one carrier frequency for communicating with the mobile stations that are within its transmission/reception area boundaries. The number of carrier frequencies employed by a given cell site may depend on various factors, such as the volume of communication traffic expected. For example, in a congested urban location, cell sites might be designed to employ two or more carrier frequencies, while in more sparsely populated rural areas, cell sites might employ only one carrier frequency.

Cell sites that employ more than one carrier frequency may be termed as having a "primary" carrier frequency and one or more "overlay carrier frequencies." Typically, the primary frequency is the carrier frequency that is implemented by all the cell sites in a particular geography, such as in a particular city and its surrounding area. Overlay frequencies are then implemented by the cell sites in the geography that carry more traffic than may be handled using only the primary frequency. It will be appreciated that implementing overlay carrier frequencies is relatively expensive. This expense is due to additional equipment costs, maintenance, licensing fees (such as charged by the Federal Communication Commission), among other costs.

In normal operation, when a mobile station is operating on a given frequency and moves into a new physical sector operating on the same frequency, the call will typically continue on that same frequency in the new physical sector (e.g., if the new physical sector is controlled by the same BSC or both physical sectors are coupled with the same BSM through respective BSCs). Through communication with the BSC (e.g., and, indirectly, the base station manger) the mobile station will simply switch to the PN offset key of the new physical sector in order to complete the handoff from one physical sector to the next. This process is termed as a "soft handoff", as the call is maintained on the same carrier frequency and only the pseudo-noise used is changed.

When a mobile station is operating on an overlay frequency carrier signal and the mobile station moves into (or toward) a new physical sector that does not implement that particular overlay frequency as a carrier signal (e.g., a cell site which handles less traffic), a process known as a "hard handoff" must occur to maintain the call. A hard handoff comprises a "call" (e.g., the communication path between the MS and the BTS) being moved from a carrier signal of the overlay frequency to a carrier signal of the primary frequency or another overlay frequency.

Due to the cost associated with implementing an overlay frequency, it is desirable that calls using the overlay frequencies be maintained on the overlay frequency as long as possible, so as to increase the utilization of the overlay frequency. Therefore, it is desirable that hard handoffs occur close to the transmission/reception boundary of the cell site implementing the overlay frequency. However, executing a hard handoff too close to the transmission area boundary may result in the call being dropped.

Currently, hard handoff locations are adjusted by performing iterative drive tests of cellular coverage areas. During a drive test, pilot signal quality information is collected using, for example, a pilot signal scanner. For CDMA systems, pilot signals are transmitted by the cell sites to facilitate call initiation as well as to facilitate handoffs of calls from one sector/cell site to another sector/cell site, among other functions. Each pilot signal has a corresponding PN offset that is used to identify it. For a cell site that does not implement a particular overlay frequency that is implemented by a neighboring cell site/sector or cell sites/sectors, a pilot signal for the overlay frequency is still employed to facilitate hard handoffs between sectors. As is known, hard handoff locations are determined based on the relative quality of the pilot signals in the coverage area.

If it is determined that hard-handoffs are occurring at undesirable locations (e.g., too far within the cell site implementing the overlay frequency or too close to the transmission/reception area boundary), adjustments are made to the wireless network, such as adjustments to pilot signal strengths. After making such adjustments, the drive test is redone to re-collect pilot signal quality information and the process is repeated. This process of iterative drive testing is time-consuming and expensive. In this regard, it may take five to seven drive tests, or more, in a given coverage area to satisfactorily adjust the hard handoff locations. Therefore, based on the foregoing, techniques for adjusting hard handoff locations and the cost associated with iterative drive tests are desirable.

SUMMARY

According to an exemplary embodiment, a method of improving mobile communication hard handoffs comprises empirically collecting an initial set of pilot signal quality information for a coverage area of at least two cellular sites/sectors. In the exemplary embodiment a first cell site comprises a first sector that implements two carrier signals, one of an overlay frequency and one of a primary frequency. The first sector also implements respective pilot signals of the overlay and primary frequency. The second cellular site comprises a second sector that implements a carrier signal of the primary frequency, but does not implement a carrier signal of the overlay frequency. The second sector does, however, implement pilot signals of both the overlay and primary frequency. Pilot signal quality information for these pilot signals may be collected, for example, using a code division multiple access (CDMA) pilot scanner (or any appropriate signal analysis apparatus) while in a coverage area of a wireless communication network (such as while driving over roads in the coverage area). For example, an E7450B Pilot Scanner, which is available from Agilent Technologies, Palo Alto, Calif. may be used.

The pilot signal quality information may then be communicated from the pilot signal scanner apparatus to a tool (e.g., a tool implemented using appropriate logic in the form of software, hardware and/or firmware). The tool receives signal quality information from the coverage area for a first pilot signal of the overlay frequency from the first sector (of the first cell site); a second pilot signal of the primary frequency from the second sector (of the second cell site); a third pilot signal of the primary frequency from the first sector; and a fourth pilot signal of the primary frequency from the second sector.

The tool then processes the pilot signal quality information to generate an output display, such as a computer display or a printed page that includes a first set of predicted locations for hard handoffs from the first sector to the second sector. For CDMA wireless systems, the output display may be generated based on a T_COMP value. For this example, T_COMP may be expressed as a ratio between the strength of the overlay pilot signal of the second sector relative to the strength of the overlay pilot signal of the first sector.

For the exemplary embodiment, the output display may also include signal quality information for at least one of the first, second, third and fourth pilot signals by geographic location in the coverage area. This provides for evaluating the predicted hard handoff locations in the context of the pilot signal quality to determine if any adjustments to the wireless network, in order to modify the hard handoff locations, are desired.

Based on the signal quality information and the predicted hard handoff locations, a modification to T-COMP may be determined, which is representative of an offset to the pilot beacon signal strength. Of course, other parameters may be modified, such as the transmission strength of one or more of the pilot signals, for example. The output display may then be regenerated using the modified T_COMP value to determine a second set of predicted hard handoff locations, which are then included in the output display. The modified T-COMP value is selected such that the second set of predicted locations is more consistent with desired hard handoff locations. The desired hard handoff locations are those locations that are close to the outer perimeter of the transmission area for the first cell site's overlay frequency, but not at a point where executing a hard handoff will result in calls being dropped. In this regard, if a hard handoff is attempted too close to the outer perimeter of the transmission area of the first cell site while the mobile station is moving (e.g., in a vehicle), there may be insufficient time and/or signal quality to execute a hard handoff before the call is dropped. Iterations of this process may be done to further modify the predicted hard handoff locations.

Using the exemplary method provides for evaluating hard handoff locations based on an initial set of empirically collected pilot signal quality drive test data using, for example, a software based tool. Such an approach allows for reduced cost and time to make modifications to a wireless communication network to improve the locations of such hard handoffs to increase the utilization of overlay carrier frequencies and/or reduce the incidence of dropped calls resulting from the hard handoff process.

In this regard, the number of drive tests (which are expensive and time consuming) may be significantly reduced. For example, depending on the particular coverage area, using iterative drive testing typically requires five to seven iterations to adjust the hard handoff locations. Using the exemplary method, this may be reduced to two drive tests, one for initial data collection and one to verify any adjustments made in the wireless network.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 2C is a modified version of the output display of FIG. 2A that includes signal quality information for pilot signals of a "primary" frequency in a coverage area;

DETAILED DESCRIPTION

Overview of Hard Handoffs

Figure 1:
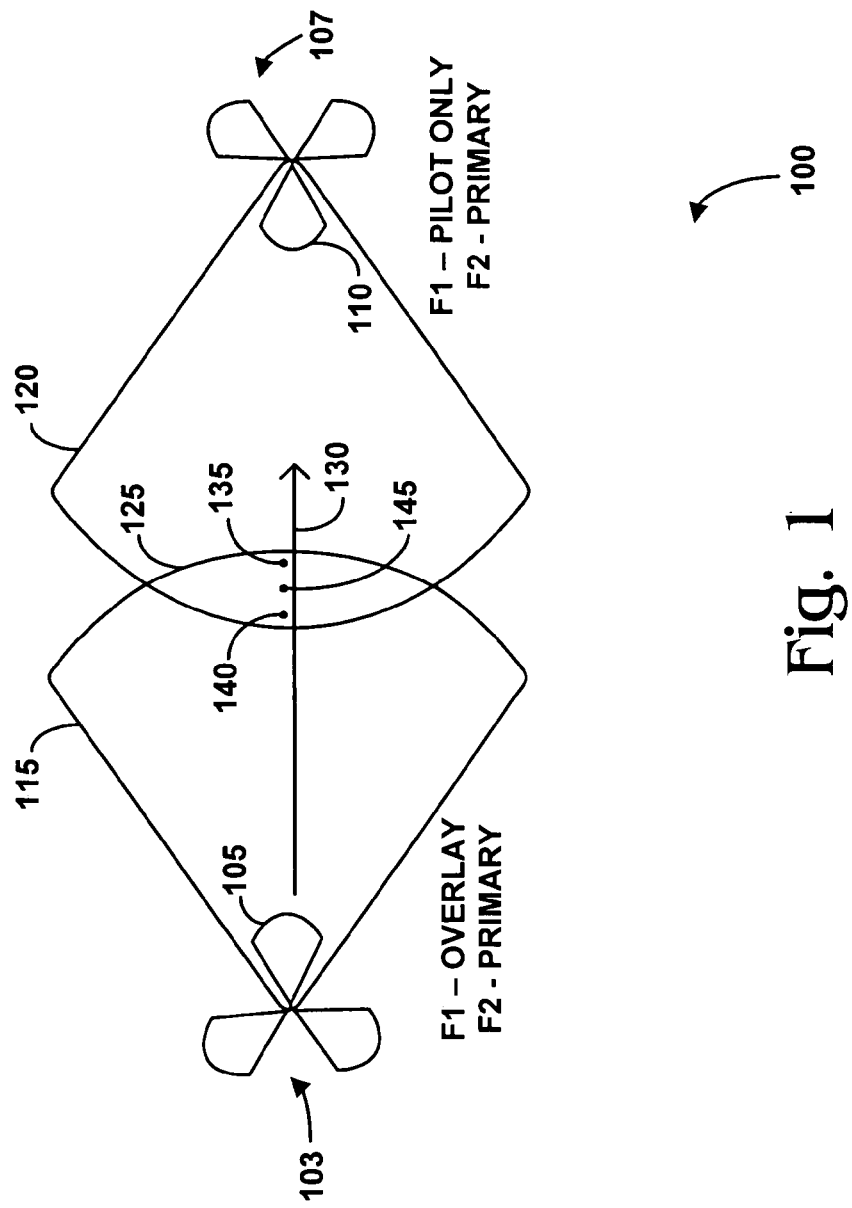
FIG. 1 is a simplified schematic diagram of two neighboring cell sites.

Referring now to FIG. 1, a simplified schematic diagram illustrating a portion of a mobile communication network 100 is shown. The network 100 includes a first cellular site 103 with a sector 105 and a second cellular site 107 with a sector 110, which may be referred to as neighboring cellular sites/sectors. The sector 105, shown in FIG. 1, employs a first frequency F1 as an "overlay" carrier frequency and a second frequency F2 as a "primary" carrier frequency. The sector 110 employs the overlay frequency F1 only as a pilot signal frequency and the primary frequency F2 as a carrier signal frequency. It will be appreciated that there are at least four pilot signals employed by the sectors 105 and 110. In this respect, each of the sectors 105 and 110 employ a pilot signal of the overlay frequency F1 and a pilot signal of the primary frequency F2. Each of these pilot signals includes a respective pseudo-noise (PN) offset to distinguish it from geographically proximate pilot signals of the same frequency, such as was described above and is known to those working in this area.

For purposes of this disclosure, a primary carrier frequency is a frequency that is employed by all cell sites in a particular geography, such as a particular city and its surrounding area. Overlay frequencies (such as F1), are employed by cell sites that are located in areas where there is more wireless communication activity (traffic) than can be accommodated using only the primary carrier frequency. These designations are, of course, exemplary.

For the network 100, the sector 105 has a transmission area perimeter 115. The term transmission area, as used herein, refers to the area in which a sector is able to successfully communicate (e.g., transmit and receive signals) with a mobile station (not shown). Likewise, the sector 110 has a transmission area perimeter of 120. The transmission area of the sectors 105 and 110 overlap (e.g., intersect) at overlap area 125. The overlap area 125, which is shown for illustrative purposes and is not necessarily to scale, is the area in which it is desired to execute hard handoffs for active mobile stations moving from the sector 105 to the sector 110, and vice versa.

A hard handoff from sector 105 to sector 110 includes "handing-off" a call from the overlay frequency (frequency F1) on the sector 105 to the primary frequency (frequency F2) on the sector 110. While this disclosure will generally describe hard handoffs being from an overlay frequency to a primary frequency, it will be appreciated that the exemplary embodiments described herein may also be applied for adjusting hard handoff locations from a primary frequency (e.g., the frequency F2 in sector 110) to an overlay frequency (e.g., the frequency F1 in sector 105). Further, any number of known approaches may used to accomplish such a hard handoff. Those approaches, which are typically implemented by a base station controller (BSC), will not be described in detail here, so as not to obscure the present invention.

In FIG. 1, an arrow indicates a direction of a travel path 130 of a MS (not shown) from the transmission area of sector 105 to the transmission area of sector 110. As the MS travels along the path 130, it passes through the overlap area 125. If the MS is connected (e.g., on a call) via the sector 105 using the overlay frequency F1 while traveling along the travel path 130, that call will need to hard handed off to the sector 110 to prevent the call from being dropped. In this regard, the call is handed off from the sector 105 to the sector 110 using a hard handoff from the overlay frequency F1 to the primary frequency F2 when the MS is in the overlap area 125.

As was previously noted, it is desirable to have such a hard handoff occur as close to the transmission area perimeter 115 of the sector 105 as possible without dropping the call, such as may occur at a location 135. If, on the other hand, the call is handed-off to the primary frequency of sector 110 at a location 140, which is at the transmission area perimeter 120 of the sector 110, the call may also be dropped for example, as a result of a momentary signal fade in the primary frequency carrier signal from the sector 110. Therefore, to avoid dropping the call, it is desirable that the hard handoff occur at a location such as the location 145, which is well within the overlap area 125, but is closer to the transmission area perimeter 115 of the sector 105 than the transmission area perimeter 120 of the sector 110 along the travel path 130. Executing hard handoffs in this manner (at the location 145) will more effectively utilize the overlay frequency (F2) carrier signal than employing handoff locations closer to the transmission area perimeter 120 of sector 110 along the travel path 130.

As was described above, adjusting such hard handoff locations (e.g., from location 135 or 140 to the location 145) is currently accomplished using iterative drive testing and repeated collection of empirical pilot signal quality information in a coverage area, the coverage area, for this example, being the area that is in and around the overlap area 125. As was also noted above, this process is time consuming and cost intensive, therefore, approaches that reduce the number of drive tests and also reduce the cost associated with those drive tests are desirable.

Exemplary Application ("Tool") for Adjusting Hard Handoff Locations

Figure 2A:
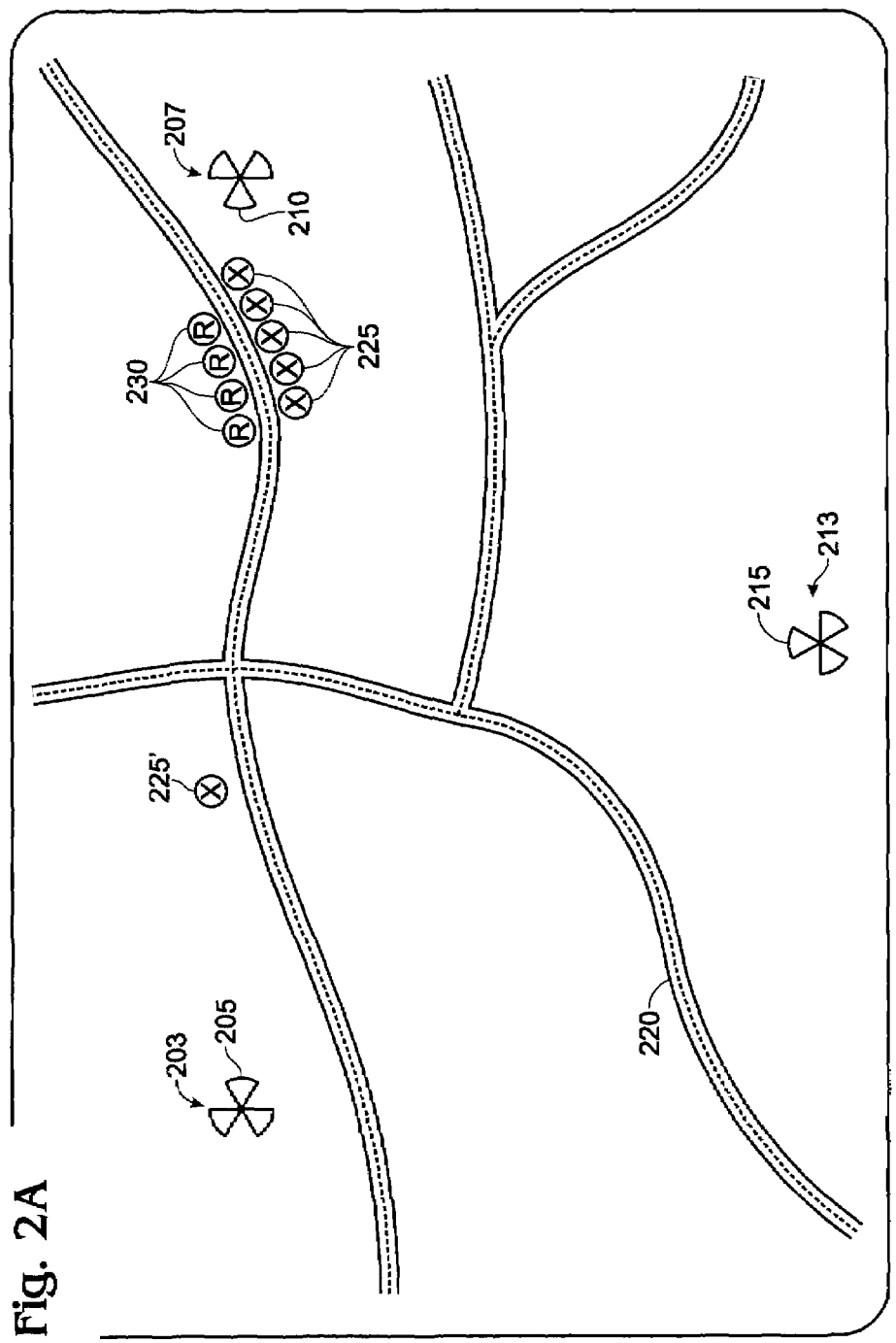
FIG. 2A is a drawing illustrating an output display in accordance with an embodiment of the invention.

Referring now to FIG. 2A, a drawing illustrating an output display that may be generated using an exemplary method is shown. Such an exemplary method may be implemented using machine executable instructions, which carry out operations and/or processes to accomplish at least a portion of the techniques described herein. Such instructions may be embodied in a software program running on a general purpose computer. Of course, other alternatives exist. For example, an exemplary method may be carried out using machine executable instructions implemented in hardware and/or firmware running on a special purpose computing machine.

As may be seen in FIG. 2A, three cell sites 203, 207 and 213 are shown. The cell sites 203 and 207 operate in similar fashion as the cell sites 103 and 107 of FIG. 100. In this regard, the cell site 203 comprises sector 205 implements two carrier signals (one of an "overlay" frequency F1 and one of a "primary" frequency F2). The sector 210 implements a pilot only signal of frequency F1 and a primary carrier signal of frequency F2. Thus, there are two pilot signals associated with each of the sectors 205 and 210. As with the sectors 105 and 110, each of the pilot signals has a respective PN offset. The sector 215 may employ one or more carrier signals but will, at a minimum, employ the same types of signals as the sector 110. Specifically, the sector 215 will implement a carrier signal of frequency F2 and pilot signals of frequencies F1 and F2. Hard handoffs may similarly occur, for example, between the sector 105 of the cell cite 103 and the sector 215 of the cell site 213. It will be appreciated that the designations "primary" and "overlay", as used herein, are merely used for the purpose of discussion and do not limit the scope of the invention to the use of any particular type of carrier and/or pilot signal configurations or designators.

After empirically collecting pilot signal quality information, such as using a code division multiple access (CDMA) pilot signal scanner, that signal quality information may be communicated to a software application ("tool") that implements an exemplary method. The tool, based on this signal quality information, generates an output display, such as the output display shown in FIG. 2A. To generate this display, the tool may load a map image containing the roads 220 shown in FIG. 2A. The loaded map may also contain geographic topology information, as will be described below. The tool may then calculate predicted hard handoff locations (for calls being handed off from the sector 205 to the sector 210) based on the pilot signal quality information. The tool then includes a first set of predicted hard handoff locations 225 and 225' (noted with circled "x" graphical indicators) in the output display. The first set of predicted locations 225/225' may, as was described above, be based on a T_COMP value that is employed in the coverage area. Briefly, the predicted hard handoff location 225' is an undesirable location and will be discussed in further detail below.

A modified value of T_COMP may then be provided to the tool and the output display may be regenerated to include a second set of predicted hard handoff locations 230 (noted with circled "R" graphical indicators). It is noted that the second set of locations 230 may be the result of several iterations of varying T_COMP. It is also noted that modified values of parameters other than T_COMP may be provided to the tool for use in determining the second set of locations 230. For example, one or more pilot signal transmission strength parameters may be modified. In this situation, the tool would extrapolate the transmission strength to calculate virtual drive test pilot signal quality information. In this respect, the modified pilot signal quality information may be calculated/determined based on the attenuation observed in the empirically collected pilot signal quality information.

Figure 2B:
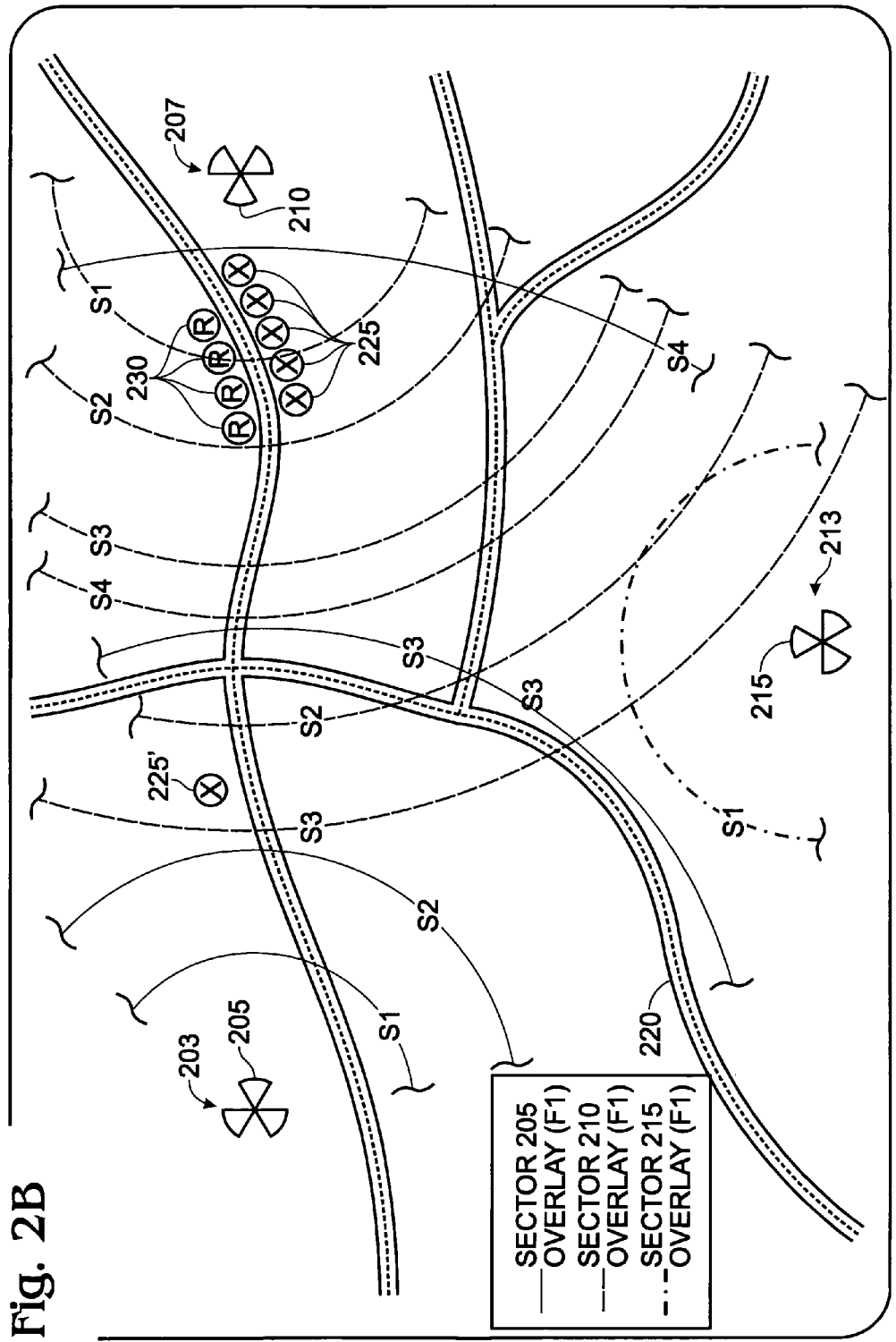
FIG. 2B is a modified version of the output display of FIG. 2A that includes signal quality information for pilot signals of an "overlay" frequency in a coverage area.

Referring now to FIGS. 2B and 2C, drawings that illustrate output displays that include signal quality information for the pilot signals of the sectors 205, 210 and 215 are shown. The FIGS. 2B and 2C are substantially the same as FIG. 2A with the exception of the inclusion of the signal quality information. Changes in measured (or calculated) signal quality in FIGS. 2B and 2C are shown using various lines to indicate the geographic distribution of pilot signal quality. Of course, numerous alternatives for indicating the geographic signal distributions may be employed. For example, a color shading scheme may be used with different colors indicating the different signal qualities on a point by point basis. Such an approach may be beneficial as signal quality may vary with terrain, and such an approach may clearly illustrate such variations in signal quality.

In FIG. 2B, signal quality information for the pilot signals implemented using the "overlay" frequency F1 are shown. A set of solid lines is used to indicate the signal quality distribution for the overlay pilot signal of sector 205, while a set of dashed lines is used to show sector 210's signal quality distribution and a set of dot-dash lines is used to illustrate sector 215's signal quality distribution. For each set of lines, "S1" indicates the strongest signal with "S4" indicating the weakest signal. These indications are, of course, exemplary, and any number of appropriate designations and/or ranges may be used, such as referencing the signal quality in dBm (in increments of 1 dBm), for example.

As may be seen in FIG. 2B, the predicted hard handoff location 225' is between S2 and S3 signal quality lines for the pilot signal from the sector 210. While a hard handoff from the sector 205 to the sector 210 executed at the location 225' may be initially successful for a MS that is traveling along the road from sector 205 to 210, that call will likely be dropped when the MS enters the region with a S4 signal quality for the pilot signal of sector 210. Therefore, it is desirable to adjust the predicted hard handoff locations, such that the predicted location 225' is eliminated as a potential handoff point. As has been previously discussed, this may be accomplished using the exemplary tool to regenerate the output display based, for example, on a modified T-COMP parameter or a modified pilot signal strength for the sector 210.

After identifying and/or receiving one or more modified parameters, the tool may then generate a second set of predicted hard handoff locations 230. For the second set of predicted handoff locations 230, it may be seen in FIG. 2 that these locations are in an area where the cell sites 210's pilot signal quality, as well as the sector 205's pilot signal quality, are sufficient to maintain the call (e.g., are not within the "S4" boundaries.)

FIG. 2C illustrates the signal quality information for the pilot signals of the primary frequency F2 for the sectors 205 and 210. It is noted that FIG. 2C shows substantially the same signal quality distributions as FIG. 2B. It will be appreciated that FIGS. 2B and 2C are merely illustrative and that the actual signal distributions would typically vary due to, for example, transmission strength differences and/or geographic topography, among numerous other factors. The exemplary tool, which may take the form of software, hardware and/or firmware, may implement a programming feature to allow a user of the tool to toggle between an output display such as that of FIG. 2B and an output display such as that of FIG. 2C. This feature provides for analyzing the predicted hard handoff locations (225/225' and/or 230) in the context of the signal quality for both the primary and overlay frequency pilot signals, in order to evaluate what adjustments to the hard handoff locations are desired.

As may also be seen in FIGS. 2B and 2C, signal quality information for the sector 215 is also shown. The sector 215 has a transmission area that overlaps the transmission area of the sectors 205 and 210. Only a single signal quality line is shown for the sector 215 for purposes of illustration that more than two sectors may be involved in determining hard handoff locations. For example, in certain instances it may be advantageous to execute a hard handoff from the sector 105 to the sector 115, instead of the sector 210.

However, when evaluating hard handoff locations between the sector 205 and the sector 210 using the exemplary tool, the tool will filter the signal quality information for the sector 215, so that the likely success of handoffs between the sectors 205 and 210 is evaluated based on their signal quality and not the signal quality of the sector 215. Various techniques may be used to filter the signal quality information, some of which are described below.

Figure 2D:
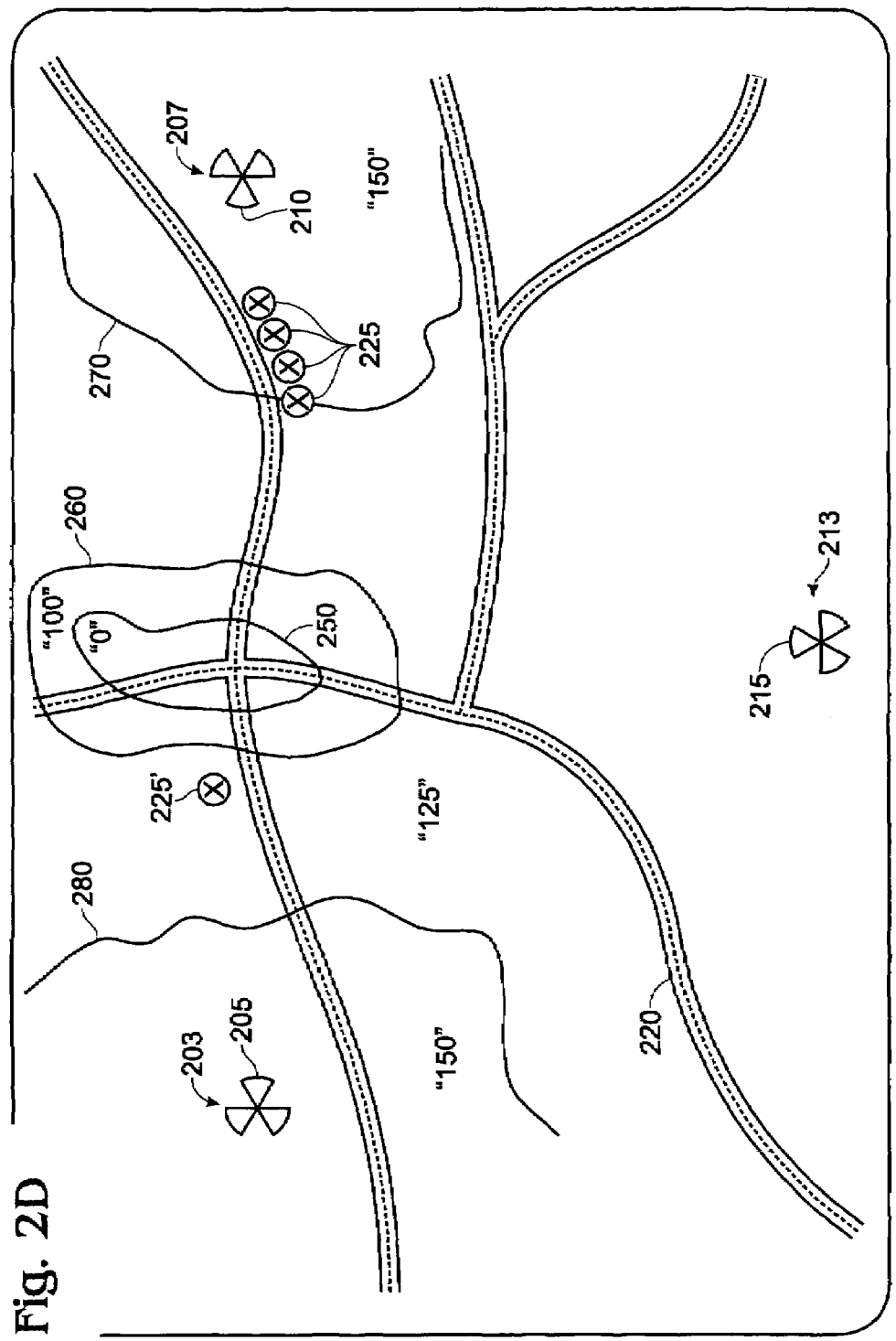
FIG. 2D is a modified version of the output display of FIG. 2A that includes geographic topographic information.

Referring now to FIG. 2D, another version of an output display that may be generated using the exemplary tool is shown. This output display is substantially similar to the output display shown in FIG. 2A. The output display shown in FIG. 2D, however, does not illustrate the second set of predicted hard handoff locations 230 of FIG. 2A. Instead the output display shown in FIG. 2D shows only the first set of predicted hard handoff location 225/225', which are based, in this example, on the empirically collected pilot signal quality information and a first value of T_COMP.

The output display of FIG. 2D further includes contour lines 250, 260, 270 and 280 to illustrate geographic topology information for the coverage area illustrated. Elevation indications are also shown in FIG. 2D. For example, within the contour line 250 an elevation "0" is indicated, while an elevation of "100" is shown within the contour line 260. These contour lines are shown for illustrative purposes and such topology information may be represented in the output display in any number of ways, such as by using colored shading, for example.

As may be seen, in FIG. 2D, a valley exists between sectors 205 and 210 in the coverage area illustrated. This information is highly useful in analyzing the predicted set of hard handoff points 225/225'. Based on this information, it may be seen that the predicted handoff point 225' is undesirable due to the presence of the valley defined by contour lines 250 and 260. Therefore, modifications to various parameters may be provided to the tool, such as a change in T_COMP, a change in the transmission strength of the pilot signal of frequency F1 from sector 210, or a change in the signal quality at the location of the predicted handoff point 225', as some examples. Once the modified parameter(s) has(have) been provided to the exemplary tool, a second set of predicted handoff locations, such as the predicted locations 230 may be determined and shown on the output display.

Exemplary Method for Improving Hard Handoff Locations

Figure 3:
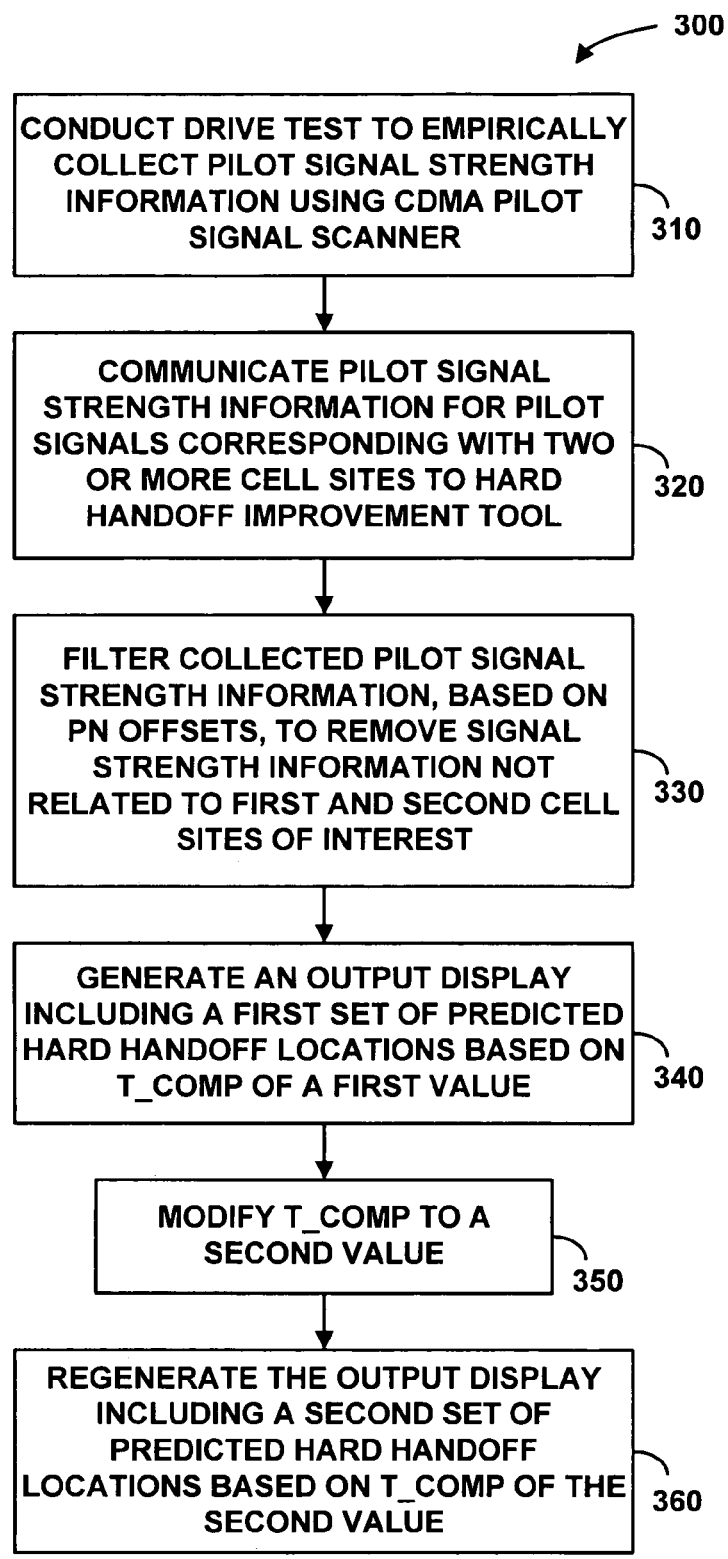
FIG. 3 is a flowchart illustrating an embodiment of a method for improving mobile communication hard handoff locations in accordance with an embodiment of the invention.

Referring now to FIG. 3, a flowchart illustrating an exemplary method 300 for improving the locations for hard handoffs in a mobile communication system is shown. The method 300 will be described with further reference to FIGS. 2A–2D.

At block 310, the method 300 comprises conducting a drive test to empirically collect pilot signal quality information using a pilot signal scanner, such as was previously described. For the coverage area shown in FIGS. 2A–2D, this information may be collected by driving the roads 220 in the coverage area. Depending on the desired precision of the collected information, signal quality information may be collected for the coverage area between the roads as well, such as by driving, if possible, or taking "spot measurements" at various locations in coverage area between the roads 220. Due to the cost savings realized by the reduction of drive testing iterations using the exemplary method, a more thorough initial pilot signal information collection process may be justified. Additionally, such a collection process may improve the accuracy of the predicted hard handoff locations determined by the tool (both the initial and the adjusted locations).

At block 320, the pilot signal quality information for the coverage area is communicated to a tool implementing the exemplary method. For this example, it is assumed that hard handoffs from the sector 205 to sector 210 of FIGS. 2A–2D are being analyzed. In this situation, the exemplary method 300 includes filtering out pilot signal information for the sector 215 at block 330. Such filtering may be accomplished using the PN offsets of the pilot signals. For example, the exemplary tool may filter out all pilot signal quality information that corresponds with the PN offsets for the sector 215. Alternatively, all pilot signal quality information that does not correspond with the PN offsets of sectors 205 and 210 may be filtered out. The latter approach may be more efficient for coverage areas with a large number of cell sites/sectors, as the filtering is done based on the PN offsets of the sectors of interest with all other pilot signal information, regardless of PN offset, being filtered out.

At block 340, the exemplary method comprises generating an output display that includes a first set of predicted hard handoff locations, such as the hard handoff locations 225 and 225' in the FIGS. 2A–2D. The first set of predicted locations may then be analyzed in the context of signal quality information (as shown in FIGS. 2B and 2C) or in the context of geographic topology (as shown in FIG. 2D), as some examples. Based on this analysis, which may be done either by a user of the exemplary tool (e.g., a RF engineer) or may be done automatically by the tool, a modified parameter(s) is selected (e.g., T_COMP, pilot signal transmission strength, etc.).

Based on the modified parameter(s), a second set of predicted hard handoff locations (e.g., the locations 230 of FIGS. 2A–2c) are determined and the output display is regenerated to include these second locations at block 360 (as shown in FIGS. 2A–2C). As was previously described, an iterative process may be used to determine the second predicted handoff locations. Once the predicted handoff locations are satisfactory (e.g., to the RF engineer), modifications may be made to the wireless communication network in the coverage area (e.g., modification of pilot signal transmission strength, use of a modified T_COMP value, etc.) to adjust the actual hard handoff locations in accordance with the desired set of hard handoff locations as predicted by the exemplary tool.

CONCLUSION

Exemplary arrangements of the present invention have been described herein. It will be appreciated, however, that those skilled in the art will understand that changes and modifications may be made to these arrangements without departing from the true scope and spirit of the present invention, which is defined by the following claims.

What is claimed is:

1. A method of improving mobile communication hard handoffs comprising:
   receiving signal quality information from a coverage area for a first pilot signal of a first frequency, the first pilot signal being from a first cellular site;
   receiving signal quality information from the coverage area for a second pilot signal of the first frequency, the second pilot signal being from a second cellular site;
   generating an output display that includes first predicted locations for hard handoffs from the first cellular site to the second cellular site, the output display being generated based on a parameter of a first value that is representative of a ratio between the strength of the second pilot signal relative to the combined strength of, at least, the second pilot signal and the first pilot signal;
   modifying the parameter from the first value to a second value; and
   regenerating the output display to include second predicted hard handoff locations based on the second value of the parameter.

2. The method of claim 1, wherein the first and second cellular sites comprise code division multiple access based cellular sites and the parameter is a T_COMP value.

3. The method of claim 1, wherein the output display further includes the signal quality information for the first and second pilot signals by geographic location in the coverage area.

4. The method of claim 1, further comprising:
   receiving signal quality information from the coverage area for a third pilot signal of a second frequency, the third pilot signal being from the first cellular site; and receiving signal quality information from the coverage area for a fourth pilot signal of the second frequency, the fourth pilot signal being from the second cellular site, wherein the output display further includes the signal quality information for the first, second, third and fourth pilot signals by geographic location in the coverage area.

5. The method of claim 4, wherein the signal quality information for the first, second, third and fourth pilot signals is empirically collected.

6. The method of claim 5, wherein the signal quality information is collected using a code division multiple access pilot scanner during a physical drive test in the coverage area.

7. The method of claim 5, further comprising, prior to generating the output display, filtering signal quality information for one or more respective pilot signals associated with a third cellular site from the empirically collected pilot signal quality information from the coverage area.

8. The method of claim 7, wherein the filtering is done based on respective pilot number offsets of the pilot signals associated with the third cellular site.

9. The method of claim 7, wherein the filtering is done based on respective pilot number offsets of the pilot signals associated with the first and second cellular sites.

10. The method of claim 4, wherein the method is implemented as a set of machine executable instructions having programming features to toggle between a first version of the output display that includes the first and second pilot signals' strength information and at least one of the first and second predicted hard handoff locations, and a second version of the output display that includes the third and fourth pilot signals' strength information and at least one of the first and second predicted hard handoff locations.

11. The method of claim 1, wherein the output display is a geographic map inclusive of the coverage area that includes graphical indicators, which designate the predicted hard handoff locations, and wherein the output display further includes graphical indicators of a geographic topography of the coverage area.

12. The method of claim 11, wherein the output display further includes color-coded shading indicative of the signal quality of at least one of the first, second, third and fourth pilot signals.

13. The method of claim 1, wherein the first frequency is implemented as an overlay carrier frequency in the first cellular site and is implemented as only a pilot signal frequency in the second cellular site.

14. The method of claim 13, further comprising modifying the signal strength of the second pilot signal to effect changing the hard handoff locations in substantial accordance with the regenerated output display.

15. The method of claim 1, wherein the coverage area comprises an overlap of a transmission area of the first cellular site and a transmission area of the second cellular site.

16. The method of claim 15, wherein the coverage area further comprises an overlap of a transmission area of third cellular site.

17. In a system for analyzing and improving mobile communication hard handoff locations, wherein pilot signal quality information for a coverage area is collected empirically during a physical drive test of the coverage area using a pilot signal scanner, an article of manufacture comprising:

a storage medium having a plurality of machine-readable instructions stored thereon, wherein the instructions, when executed, provide for:

receiving signal quality information from the coverage area for a first pilot signal of a first frequency, the first pilot signal being from a first cellular site;

receiving signal quality information from the coverage area for a second pilot signal of the first frequency, the second pilot signal being from a second cellular site;

generating an output display that includes first predicted locations for hard handoffs from the first cellular site to the second cellular site, the output display being generated based on a parameter of a first value that is representative of a ratio between the strength of the second pilot signal relative to the combined strength of, at least, the second pilot signal and the first pilot signal;

modifying the parameter from the first value to a second value; and regenerating the output display to include second predicted hard handoff locations based on the second value of the parameter.

18. The article of claim 17, wherein the output display comprises a geographic map and further includes the signal quality information for the first and second pilot signals by geographic location.

19. The article of claim 17, wherein the instructions further provide for:

receiving signal quality information from the coverage area for a third pilot signal of a second frequency, the third pilot signal being from the first cellular site; and receiving signal quality information from the coverage area for a fourth pilot signal of the second frequency, the fourth pilot signal being from the second cellular site, wherein the output display further includes the signal quality information for the first, second, third and fourth pilot signals by geographic location.

20. The article of claim 19, wherein the instructions further provide for, prior to generating the output display, filtering signal quality information for one or more respective pilot signals associated with a third cellular sites from the empirically collected pilot signal quality information for the coverage area.

21. The article of claim 20, wherein the filtering is done based on respective pilot number offsets of the pilot signals associated with the third cellular site.

22. The article of claim 20, wherein the filtering is done based on respective pilot number offsets of the pilot signals associated with the first and second cellular sites.

23. The article of claim 17, wherein a transmission power of the second pilot signal is modified in correspondence with the second value of the parameter, such that actual hard handoff locations substantially correspond with the regenerated output display.

24. A method of improving mobile communication hard handoffs comprising:

receiving signal quality information from a coverage area for a first pilot signal of a first frequency, the first pilot signal being from a first cellular site;

receiving signal quality information from the coverage area for a second pilot signal of the first frequency, the second pilot signal being from a second cellular site;

receiving signal quality information from the coverage area for a third pilot signal of a second frequency, the third pilot signal being from the first cellular site;

receiving signal quality information from the coverage area for a fourth pilot signal of the second frequency, the fourth pilot signal being from the second cellular site, generating an output display that includes first predicted locations for hard handoffs from the first cellular site to the second cellular site and the signal quality information for at least one of the first, second, third and fourth pilot signals by geographic location in the coverage area, the output display being generated based on a parameter of a first value that is representative of a ratio between the strength of the second pilot signal relative to the combined strength of, at least, the second pilot signal and the first pilot signal;

modifying the parameter from the first value to a second value; and regenerating the output display to include second predicted hard handoff locations based on the second value of the parameter.

25. The method of claim 24, further comprising filtering signal quality information for one or more respective pilot signals associated with a third cellular site from the empirically collected pilot signal quality information for the coverage area prior to generating the output display.

26. The method of claim 24, further comprising modifying the signal strength of the second pilot signal to effect changing actual hard handoff locations in substantial accordance with the regenerated output display.

27. The method of claim 24, further comprising modifying the value of the parameter used by one or more mobile stations in the coverage area to the second value.

28. The method of claim 24, wherein the one or more mobile stations comprise code division multiple access based mobile stations and the parameter comprises a T_COMP value.

29. In a system for analyzing and improving mobile communication hard handoff locations, wherein pilot signal quality information for a coverage area is collected empirically during a physical drive test of the coverage area using a pilot signal scanner, an article of manufacture comprising:

a storage medium having a plurality of machine-readable instructions stored thereon, wherein the instructions, when executed, provide for:

receiving signal quality information from the coverage area for a first pilot signal of a first frequency, the first pilot signal being from a first cellular site;

receiving signal quality information from the coverage area for a second pilot signal area of the first frequency, the second pilot signal being from a second cellular site;

receiving signal quality information from the coverage area for a third pilot signal of a second frequency, the third pilot signal being from the first cellular site;

receiving signal quality information from the coverage area for a fourth pilot signal of the second frequency, the fourth pilot signal being from the second cellular site, generating an output display that includes first predicted locations for hard handoffs from the first cellular site to the second cellular site and the signal quality information for at least one of the first, second, third and fourth pilot signals by geographic location in the coverage area, the output display being generated based on a parameter of a first value that is representative of a ratio between the strength of the second pilot signal relative to the combined strength of, at least, the second pilot signal and the first pilot signal;

modifying the parameter from the first value to a second value; and regenerating the output display to include second predicted hard handoff locations based on the second value of the parameter.

* * * * *